INVENTOR
Richard B. Ransom.
BY
Harness, Dickey & Pierce.
ATTORNEYS.

June 5, 1945.  R. B. RANSOM  2,377,451
UNIVERSAL JOINT
Filed Oct. 6, 1942  2 Sheets-Sheet 2

INVENTOR
Richard B. Ransom.
BY
Harness, Dickey & Pierce.
ATTORNEYS.

Patented June 5, 1945

2,377,451

UNITED STATES PATENT OFFICE 2,377,451

UNIVERSAL JOINT

Richard B. Ransom, Knoxville, Tenn., assignor to Universal Products Company Incorporated, Dearborn, Mich., a corporation of Delaware Application October 6, 1942, Serial No. 460,974

6 Claims. (Cl. 64—21)

The invention relates generally to universal joints for connecting shafts and has particular relation to universal joints of the constant velocity type.

One object of the present invention is to provide a constant velocity universal joint of improved character wherein a cross is employed in the joint.

Another object of the invention is to provide a constant velocity type joint embodying a pair of yokes and a cross with improved means for centering the cross.

Another object of the invention is to provide in a constant velocity type joint, such as last mentioned, means for centering the cross which, at the same time, strengthens one of the yoke members.

And, in general, it is an object of the invention to provide a constant velocity type joint which is relatively simple and requires few parts and which may be assembled easily.

Other objects of the invention will become apparent from the following specification, the drawings relating thereto, and from the claims hereinafter set forth.

For a better understanding of the invention reference may be had to the drawings wherein.

Figures 1, 2:
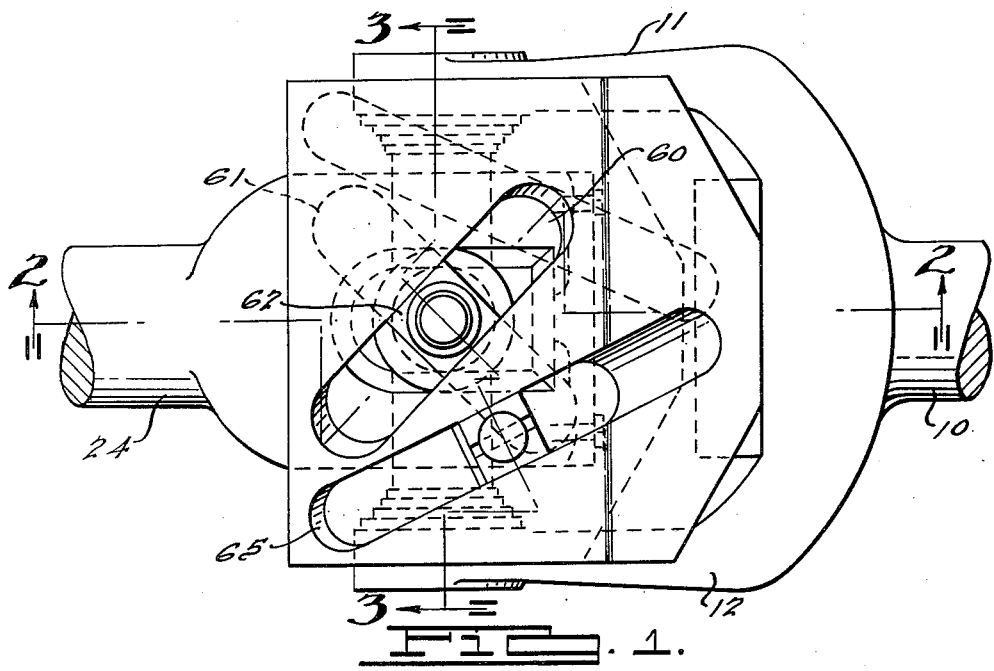
Figure 1 is a plan view illustrating a constant velocity type joint constructed according to one form of the invention.
Fig. 2 is a view taken substantially along the line 2—2 of Fig. 1.
Figure 3:
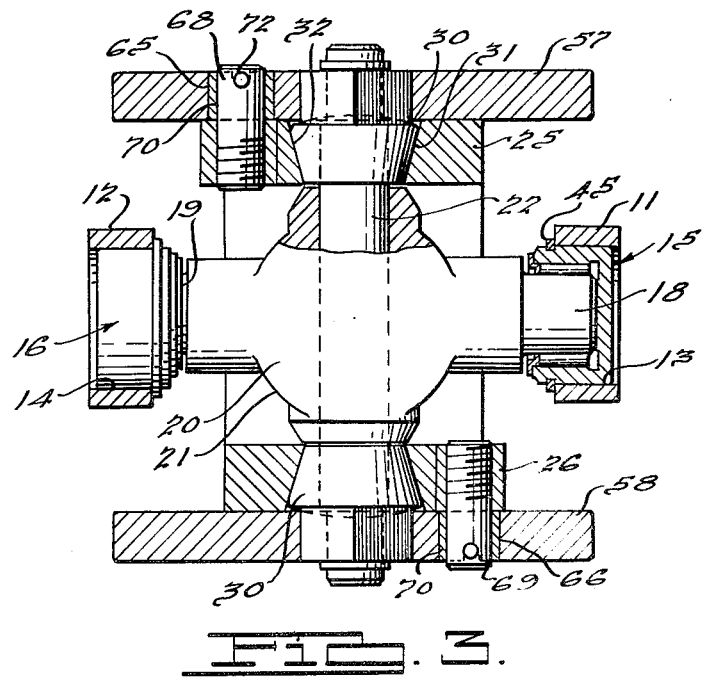
Fig. 3 is a cross-sectional view taken substantially along the line 3—3 of Fig. 1.

Referring to Figs. 1, 2, and 3, the joint includes a shaft member 10 having yoke arms 11 and 12 which, as shown by Fig. 3, are provided with apertures 13 and 14. With particular reference to Fig. 3, these apertures respectively receive bearing assemblies indicated generally at 15 and 16 provided on diametrically opposite trunnions 18 and 19 of a cross 20. This cross has a central, spherical body 21 and a transversely extending press fitted pin 22 located at right angles to the trunnions 18 and 19.

A second shaft member 24 is provided with cylindrically arranged yoke arms 25 and 26, and these arms respectively are provided with axially directed slots 27 and 28. The slots respectively receive opposite ends of the pin 22, and, as shown by Fig. 2 and Fig. 3, a tapered roller 30 is provided on each end of the pin and opposite sides 31 and 32 of each slot inwardly converge and engage the side of the roller. Roller bearings 33 may be provided around the pin within the roller, as shown by Fig. 2. It should be apparent that the cross may rock about the axis of the trunnions 18 and 19 so as to swing the pin 22 along the slots 27 and 28 and that, during this action, the trunnions 18 and 19 will turn in the bearings 15 and 16 while the rollers 30 will move along the slots. Likewise, it should be apparent that the cross may swing about the axis of the pin 22 and, during this action, the pin may turn in the rollers 30.

For centering the cross on shaft 24, the shaft member 24 has a projection 35 at the base of the yoke arms 25 and 26, and this projection has a spherical surface 36 in contact with the spherical body 21 of the cross. At the open end of the yoke on shaft 24 a bridging member 38 extends between the free ends of the arms 25 and 26 and is secured thereto by means of screws 40 and 41. This bridging member has a projection 42 provided with a spherical surface 43 which substantially contacts the spherical portion 21 of the cross diametrically opposite the projection 35. It might be added that the ends of the trunnions 18 and 19 substantially contact the base portions of the bearing cup in the bearing assemblies 15 and 16, and that these bearing cups are retained against radial outward movement by means of a ring 45, and it follows from this that this centers the cross in the yoke arms 11 and 12.

In order to bisect the angle so as to obtain constant velocity of operation, means are provided for moving the cross so as to swing the pin 22 in the slots 27 and 28 when the shafts 24 and 10 are relatively deflected. In Fig. 2, if the shaft 24 moves upwardly so as to dispose it at an angle to the shaft 10, the pin 22 should be moved through an angle half as great as the angle the shaft 24 is moved, so that the pin 22 will be disposed in a position where it bisects the angle between the shafts. For accomplishing this result, a bisector 50 is provided on the shaft 10, and this bisector has a rear yoke portion 51 providing arms 52 and 53 which slidably fit opposite sides of a collar 54 turnable on a pin 55 engaging the shaft member 10. This permits the bisector 50 to turn about the axis of shaft 10 and with respect to the shaft, while causing the bisector to move with the shaft when the latter pivots about the axis of trunnions 18 and 19.

Figure 4:
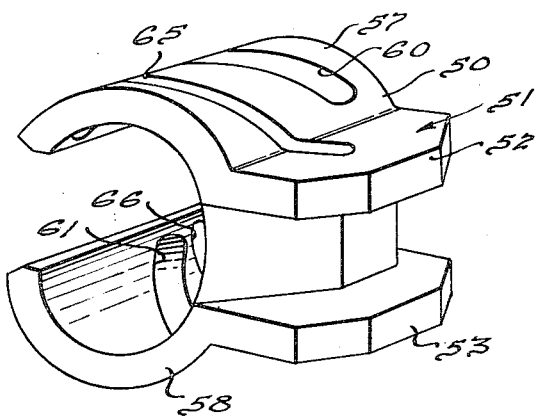
Fig. 4 is a detailed view illustrating a member provided for shifting the cross during operation of the joint.

The bisector 50 has cylindrical yoke arms 57 and 58 which substantially contact the outer surfaces of the yoke arms 25 and 26, and such bisector arms are provided with slots 60 and 61 receiving projecting ends of the pin 22. A block 62 is provided on each end of the pin and within the slot, and this block is maintained in position by means of a split ring 63 located in a groove 64 on the end of the pin. The slots 60 and 61, as best shown by Figs. 1 and 4, are arranged diagonally and in transverse relation. Other slots 65 and 66 are provided on the arms 57 and 58 of the bisector and these, respectively, receive pins 68 and 69 which are threaded into the yoke arms 25 and 26 respectively. A block 70 is provided on each of the pins 68 and 69 and is retained in position by means of a pin 72 extending transversely through the pin and notches in the block. It may be observed that the slots 65 and 66 are also arranged in diagonal relation and transversely with respect to each other but the angularity of these slots is different from the angularity of slots 60 and 61.

When the shaft 24 is deflected upwardly, for instance, as seen in Fig. 2, the yoke arms 25 and 26 will turn within the yoke arms 57 and 58, and the blocks 70 will be moved along the slots 65 and 66. It is evident that this will cause the bisector 50 to move or shift downwardly, as seen in Fig. 1, along the axis of the trunnions 18 and 19. Shifting of the bisector downwardly, as seen in Fig. 1, will cause the blocks on the ends of the pin 22 to shift in the slots 60 and 61, and this can only be done through turning of the pin about the axis of the trunnions 18 and 19 so as to swing the cross in the same direction that the shaft 24 has deflected. The angularity of the slots 60 and 61, 65 and 66 is such that this swinging of the cross will only be equal to half the swinging of the shaft 24 so that the pin 22 will be disposed in a position where it bisects the angle between the shafts 18 and 24.

The particular bisecting device described and illustrated does not form a part of the present invention but constitutes the invention of George E. Dunn, and is to be embodied in a patent application filed by him. The serial number of this application is identified as 464,491 and has its filing date November 4, 1942.

Although only one form of the invention has ben illustrated and described in detail, it will be apparent to those skilled in the art that various modifications may be made without departing from the scope of the following claims.

What is claimed is:

1. In a constant velocity joint, a cross having four outwardly projecting, circumferentially separated trunnions, a shaft element having yoke arms provided with diagrammatically aligned openings receiving two of the trunnions in bearing relation thereto for turning about an axis fixed relative to the arms, and a second shaft element having yoke arms provided with axially directed slots receiving the other trunnions so as to allow movement of the latter along the slots.

2. In a constant velocity joint, a cross having four outwardly projecting, circumferentially separated trunnions, a shaft element having yoke arms provided with diametrically aligned openings receiving two of the trunnions in bearing relation thereto for turning about an axis fixed relative to the arms, and a second shaft having yoke arms provided with axially directed slots receiving the other trunnions so as to allow movement of the latter along the slots, said arms on the second shaft element being axially curved with the center line of the first trunnions substantially at the center of curvature.

3. In a constant velocity joint, a cross having four outwardly projecting, circumferentially separated trunnions, a shaft element having yoke arms provided with diametrically aligned openings receiving two of the trunnions in bearing relation thereto for turning about an axis fixed relative to the arms, a second shaft having yoke arms provided with elongated axially directed slots receiving the other trunnions and which are provided with side walls converging towards the center of the cross, and conical rollers on such other trunnions and contacting said side walls.

4. In a constant velocity joint, a cross having four outwardly projecting, circumferentially separated trunnions, a shaft element having yoke arms provided with diametrically aligned openings receiving two of the trunnions in bearing relation thereto, a second shaft having yoke arms provided with axially directed slots receiving the other trunnions so as to allow movement of the latter along the slots, and a member bridging the gap between the free ends of yoke arms on the second shaft and releasably secured thereto.

5. In a constant velocity joint, a cross having four outwardly projecting, circumferentially separated trunnions, a shaft element having yoke arms provided with diametrically aligned openings receiving two of the trunnions in bearing relation thereto, a second shaft having yoke arms provided with axially directed slots receiving the other trunnions so as to allow movement of the latter along the slots, a member bridging the gap between the ends of the yoke arms on the second shaft and connected thereto, and means for centering the cross between the yoke arms on the second shaft and comprising spherical surface portions on opposite sides of the central part of the cross and spherical surface portions on the second shaft and on the bridging member which respectively engage the surface portions on the cross.

6. In a constant velocity joint, a cross having four outwardly projecting, circumferentially separated trunnions, a shaft element having yoke arms provided with diametrically aligned openings receiving two of the trunnions in bearing relation thereto, a second shaft member having yoke arms provided with axially directed slots receiving the other trunnions so as to allow movement of the latter along the slots, a member bridging the gap between the ends of the yoke arms on the second shaft member and connected thereto, and means for locating the cross axially of the second shaft and comprising surface portions on opposite sides of the central part of the cross and other surface portions on the second shaft and on the bridging member which respectively engage the surface portions on the cross.

RICHARD B. RANSOM.